Feb. 9, 1932.  J. W. LEDEBOER  1,844,404

COLORED CEMENT PRODUCT

Filed Jan. 31, 1930

INVENTOR
John W. Ledeboer
BY
Edwards, Bower & Pool
ATTORNEYS

Patented Feb. 9, 1932

1,844,404

UNITED STATES PATENT OFFICE

JOHN W. LEDEBOER, OF AMBLER, PENNSYLVANIA, ASSIGNOR TO AMBLER ASBESTOS SHINGLE & SHEATHING COMPANY, OF AMBLER, PENNSYLVANIA, A CORPORATION OF PENNSYLVANIA

COLORED CEMENT PRODUCT

Application filed January 31, 1930. Serial No. 424,919.

This invention relates to asbestos cement material and particularly to the coloring of the surface thereof.

The object of the invention is to provide an asbestos cement slab, sheet, shingle or the like having a surface coloring that is pleasing in appearance and durable in service and using a minimum amount of coloring matter to give the desired effect. A further object of the invention is to provide a process and apparatus for the economical production of the colored surface on the asbestos cement material preferably during the manufacture thereof.

In the accompanying drawings illustrating the invention

Figure 1:
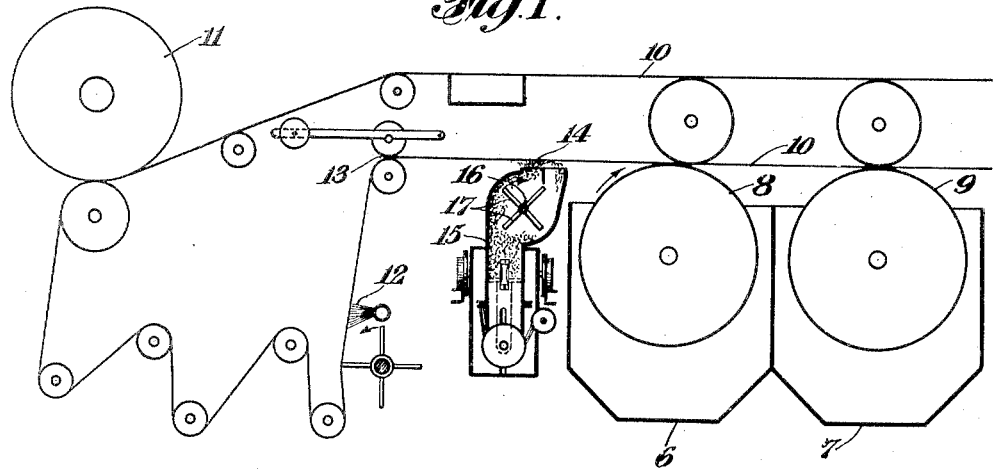
Figure 2:
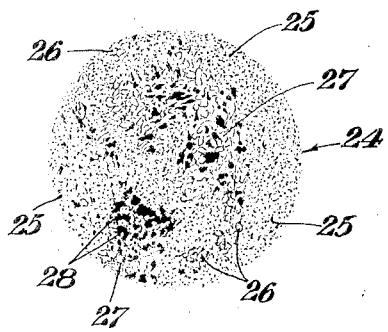
Figure 3:
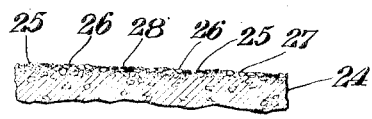

Fig. 1 is a diagrammatic view of apparatus showing the application of the coloring material to the surface of asbestos cement shingles during their formation by the Hatschek process, Fig. 2 is a greatly enlarged view of a typical portion of the colored face of the shingle and Fig. 3 is a similarly enlarged cross sectional view of a portion of the colored surface.

In the particular apparatus shown in Fig. 1 the asbestos-cement mixture in the form of a watery slurry in tanks 6 and 7 is picked up in film form by drums 8 and 9 and deposited in layers one on top of the other on the belt 10 carrying these films to the accumulating roll 11, on the surface of which the films are wound up to desired thickness and then cut and stripped to shingle size. No coloring is applied to the layers until the end of the accumulation on the roll 11, the final surface layer being colored by coloring the upper surface of the film from drum 8 by the method now to be described.

The belt 10 is continuous, and after leaving the accumulating roll 11 is washed at 12 and squeezed at 13 so as to be in a wet but not a dripping condition. Then at 14 just in advance of the drum 8 the under surface of this belt, which is to pick up the slurry films, has dusted onto it a dry color composition so that it retains only such particles thereof as will be held by adherence to the wet surface of the belt. The dusting means comprises the trough 15 and rotary stirrer 16 with a series of paddles 17.

The color composition comprises equal parts of cement (Portland), powdered asbestos fiber and an inert ground or granular material, such as ground asbestos cement scrap. To this medium is added the color, such as powdered red oxide of iron equal to about one half of the cement by weight. A supply of this composition is maintained in the trough 15 in quantity sufficient to be reached and thrown upward by the paddles 17.

When the portion of the belt 10 corresponding to the final color layer reaches the point 14 the stirrer 16 is temporarily set in rotation and throws the powdery color composition upward against the belt over substantially the full width of the belt and for a considerable distance in the direction of movement of the belt.

Both colored and uncolored particles of the dusted composition adhere to the surface of the belt in a layer substantially covering the belt surface and of nearly uniform thickness due to the uniform wetting of the belt, and any further particles meeting the dryer surface of the adhering layer will not adhere but will fall off so that the wet surface of the belt exerts a natural selective action both as to the amount and distribution of the coloring composition. As the cement particles are wetted they form additional adherences not only to the belt but to the coloring and the inert particles of the color composition tending to make the belt carried film sticky and easily combinable with the film brought up by the drum 8.

The slurry in the tanks 6 and 7 comprises cement (Portland), about 80%; asbestos fibers, about 13½% and an inert ground or granular material, such as ground scrap or sand, 6½%; these ingredients being mixed with an excess of water and forming a thin film adhering to the drum 8 and carried upward to combine with the film of coloring composition on the under surface of the belt 10. As these two films merge together to a composite colored film under the pressure of the belt against the roll 8, and as the composite film thus formed is carried on to pick up the other film from the drum 9 around to the accumulating roll 11, the tendency of the coloring material is to adhere and combine with the wet sticky Portland cement, but to leave the inert particles of the color composition and the slurry film uncolored. Consequently, the coloring of the surface of the final web, film or layer is not continuous but is much broken up by the final surface particles of uncolored inert material as indicated in Figs. 2 and 3.

In Fig. 2 a portion of the shingle is shown at 24 with the combined cement and color at 25 and the uncolored particles of inert material at 26. These uncolored particles are very small and are quite indistinguishable individually at any considerable distance, say twenty feet or so, as when the shingles constituting a house roof are viewed from the ground. Their distribution is entirely haphazard, and as a result they tend, at some irregular points, to form slight clusters as indicated for instance at 27, giving a gray or neutral colored spot distinguishable when the shingle is held several feet from the eye of the observer. At greater distances even these larger clusters merge into a substantially uniform coloring of the entire surface of the shingle, but while these neutral specks and spots are not separately distinguishable to the observer as the shingles are ordinarily applied on the roof, their effect is to give a softening or deepening of the color and to avoid an undesirable flatness of coloring observable where the color material is more uniform and without the relief given by the neutral uncolored spots. The colored material of this invention is, therefore, much more pleasing in appearance as applied to the roof. By far the greater portion of the surface is formed by the cement material combined with the coloring particles, the uncolored areas constituting approximately 10% of the total surface area, and these uncolored particles in spots are so small and so generally distributed as to be entirely lost and indistinguishable at a distance.

While most of the uncolored particles are grayish or neutral, some of them are black as indicated at 28, but these are quite indistinguishable when not magnified and the general appearance of the uncolored specks or spots is a light gray.

Another advantage of the coloring of this invention is the thorough incorporation of the color particles into the cement. The film from the slurry carries up an excess of water so that the cement of the coloring composition as well as that of the slurry is rendered sticky and gelatinous, and the relative movement of the two films as they meet and as they are carried along by the belt to the accumulating roll thoroughly mix the coloring particles into the sticky cement film so as to form a perfect incorporation of the coloring in the cement film and a perfect bond of the coloring cement film with the rest of the material. At the same time there is an appreciable interruption of the surface by uncolored particles which are not covered over by the colored cement film but form surface particles interrupting the continuity of the surface coloring.

In the drawings the red or other characteristic roofing color is indicated by the stippling, the remaining portions being uncolored and illustrating chance clusters of the uncolored particles forming typical spots which are intermingled and sprinkled over the entire surface to give the desired modified color effect. In roofing in particular pure colors are likely to appear harsh and garish, but with the blend of the surface coloring of this invention the color effect is softened by the distribution of the neutral tint with a result that is very pleasing to the eye.

I claim:

1. The process of producing a colored article of asbestos cement comprising making a thin deposit of coloring material on a belt, forming a slurry of cement material and picking up a film therefrom, superposing said film on said coloring deposit on said belt, assembling said combined color deposit and cement film as the surface layer or web of a body of cementitious material and pressing the body and layer together and permitting the cement to set.

2. The process of producing a colored article of asbestos cement comprising making a thin deposit of powdered coloring material on a web belt, forming a slurry of cement material and picking up a film therefrom, superposing said film on said coloring deposit on said belt, assembling said combined color deposit and cement film as the surface layer or web of a body of cementitious material and pressing the body and layer together and permitting the cement to set so that said body is provided with an integral surface coloring.

3. The process of producing a colored article of asbestos cement comprising making a thin deposit of powdered coloring material on the under surface of a wet belt, forming a slurry of cement material and picking up a film therefrom, said coloring material or slurry including fine particles of inert material, superposing said film on said coloring deposit on said belt, assembling said combined color deposit and cement film as the surface web or layer of a body of cementitious material with the inert material uncolored and distributed indiscriminately over the colored surface and pressing the body and layer together and permitting the cement to set so that said body has an integral surface coloring with uncolored particles distributed and clustered indiscriminately over the surface.

4. A colored cement article comprising a body portion having set Portland cement and a surface layer of Portland cement and coloring and asbestos fibers and inert material, the coloring being held by the cement and the inert material being substantially uncolored and forming uncolored specks and spots distributed irregularly over the surface and of varying size and shape so as to be indistinguishable at a distance.

5. A colored cement article comprising a body portion having set Portland cement and asbestos fibers and inert material mixed therewith and a surface layer of Portland cement and coloring and asbestos fibers and inert material, the coloring being held by the cement and the inert material being substantially uncolored and forming uncolored specks and spots distributed irregularly over the surface and of varying size and shape so as to be indistinguishable at a distance.

JOHN W. LEDEBOER.